United States Patent [19]

Voles

[11] Patent Number: 5,068,666

[45] Date of Patent: Nov. 26, 1991

[54] RADAR

[75] Inventor: Roger Voles, London, England

[73] Assignee: Thorn EMI Electronics Limited, Hayes, England

[21] Appl. No.: 412,531

[22] Filed: Jul. 5, 1989

Related U.S. Application Data

[63] Continuation of Ser. No. 81,808, Jul. 21, 1987, abandoned.

[30] Foreign Application Priority Data

Jul. 30, 1986 [GB] United Kingdom ............... 8618646
Mar. 27, 1987 [GB] United Kingdom ............... 8707444

[51] Int. Cl.[5] .................... G01S 13/10; G01S 13/24; G01S 7/28
[52] U.S. Cl. .................... 342/192; 342/193; 342/196; 342/85; 342/129
[58] Field of Search .............. 342/85, 128, 129, 192, 342/193, 196, 159, 160, 162, 90, 179, 194, 195

[56] References Cited

U.S. PATENT DOCUMENTS

| | | | |
|---|---|---|---|
| 3,603,919 | 9/1971 | Moore | 342/192 X |
| 3,662,388 | 5/1972 | Mott et al. | 342/190 |
| 3,772,689 | 11/1973 | Root, Jr. | 342/188 |
| 4,053,886 | 10/1977 | Wright et al. | 342/192 |
| 4,106,019 | 8/1978 | Alexander et al. | 342/108 |
| 4,450,444 | 5/1984 | Wehner et al. | 342/25 |
| 4,470,048 | 9/1984 | Short, III | 342/189 |
| 4,527,161 | 7/1985 | Wehner | 342/152 |
| 4,538,149 | 8/1985 | Wehner | 342/194 |
| 4,546,355 | 10/1985 | Boles | 342/179 |
| 4,547,775 | 10/1985 | Wehner et al. | 342/201 |
| 4,603,331 | 7/1986 | Wehner | 342/192 |
| 4,630,051 | 12/1986 | Adams et al. | 342/133 |
| 4,649,388 | 3/1987 | Atlas | 342/26 |
| 4,707,697 | 11/1987 | Coulter et al. | 342/25 |
| 4,719,467 | 1/1988 | Voles | 342/179 |
| 4,864,307 | 9/1989 | Potage et al. | 342/192 |
| 4,897,660 | 1/1990 | Gold et al. | 342/192 |
| 4,992,797 | 2/1991 | Gjessing et al. | 342/192 |
| 5,012,252 | 4/1991 | Faulkner | 342/192 |

*Primary Examiner*—John B. Sotomayor
*Attorney, Agent, or Firm*—Fleit, Jacobson, Cohn, Price, Holman & Stern

[57] ABSTRACT

To provide stationary or mobile radar with the capability of measuring the true range profile, a radar system includes a voltage oscillator coupled to a duplexer via a pulse modulation circuit. A digital control circuit provides a sweeping 500 Mhz frequency (F) of 6N successive batches of pulses being incremented in steps of F/6N. Returns received in response to each transmitted pulse are then combined in a mixing circuit with the signal from the local oscillator to generate a signal IF; each signal is summed with signals for the same range cell derived from earlier pulses transmitted at the same frequency; thereafter the signals pass through a FFT circuit.

To maintain the "dissected" spectrum centered at the $2N^{th}$ cell, respective summations are carried out in two circuits, and then differenced in and normalized by the total signal energy present in the true profile range obtained from a summing circuit, the output therefrom providing an error signal whose magnitude and sign are used to estimate any change required in the value of prf, fr, thereby to achieve the value of T which will maintain the dissected spectrum centered on the $2N^{th}$ range cell.

1 Claim, 6 Drawing Sheets

RADAR

This application is a continuation of application Ser. No. 07/081,808, filed July 21, 1987 now abandoned.

BACKGROUND OF THE INVENTION

This invention relates to a radar and it relates especially, though not exclusively, to a radar used to obtain the true range profile within the radar footprint.

There has arisen a need to improve the performance of a non-coherent frequency agile pulsed radar to measure the true radar profile within the radar footprint to a range resolution commensurate with the total bandwidth of the frequency agile emissions.

SUMMARY OF THE INVENTION

The present invention enables measurement of the true range profile either with a stationary radar or with a mobile radar; in one example of mobile radar for use in helicopters, a target could be tracked as it moves through a variety of natural or urban clutter environments, or alternatively these clutter environments could be recorded in the absence of a target.

Consequently, the true range profile of the entire contents of the footprint can be obtained.

Accordingly there is provided a radar comprising means for transmitting a succession of pulses at different frequencies and for receiving corresponding returns from scatterers irradiated by the pulses, including a reference scatterer having a velocity component in the range direction, transformation means effective to derive from said returns a plurality of transformation signals representing a distribution of pairs of said scatterers, as a function of differential range, and means to influence transmission of said succession of pulses so as to selectively emphasize the effect of the reference scatterer in said plurality as compared with the effect of the other scatterers, said frequencies being transmitted in accordance with a monotonic sequence and the period for transmitting the sequence of frequencies being controllable.

BRIEF DESCRIPTION OF THE DRAWINGS

In order that the invention may be carried readily into effect specific embodiments thereof are now described, by way of example only, by reference to the accompanying drawings of which

DETAILED DESCRIPTION OF THE INVENTION

Figure 1:
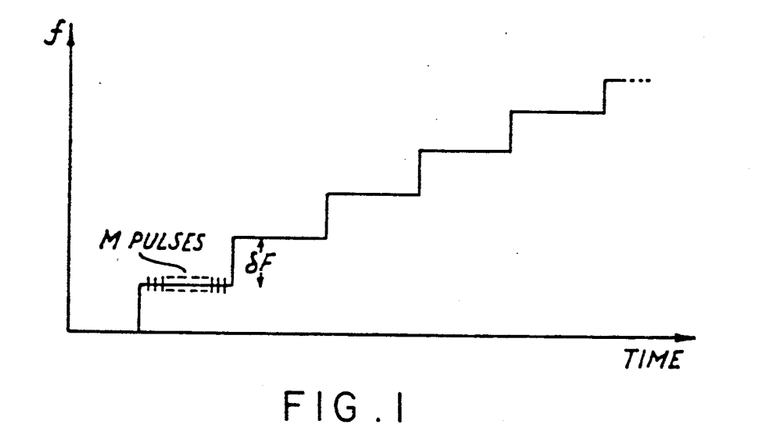
FIG. 1 shows a step-wise variation of transmission frequency as a function of time.

The radar is designed to exploit the different spatial dispositions and extensions of scatterers, including a reference scatterer having an appropriate velocity component in the range direction, within a region illuminated by the radar pulse. To this end, the radar exploits an effect which can be understood by considering a simplified example in which a non-coherent radar illuminates a pair of scatterers spaced apart from one another, down range by a distance r, hereinafter referred to as differential range. The radar frequency f is swept, in stepwise manner, over a frequency range F, the frequency of 2N successive batches of M pulses being incremented in steps of $$\delta f = \frac{F}{2N},$$

as illustrated in FIG. 1.

Figure 2:
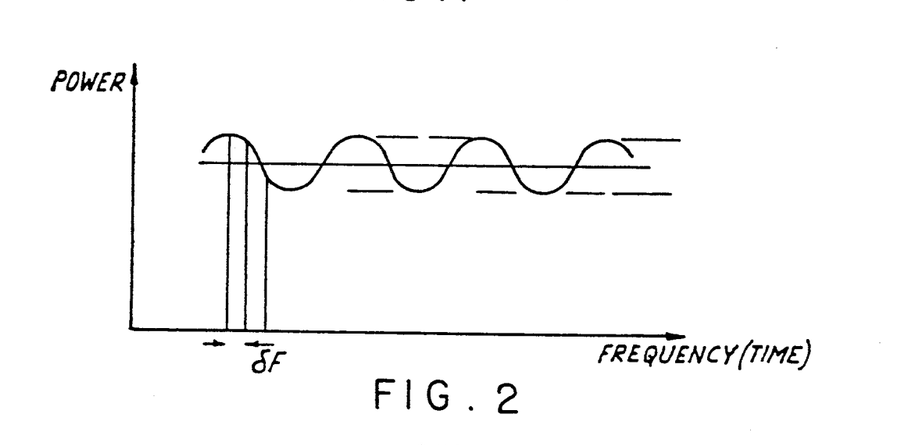
FIG. 2 illustrates a variation with frequency in the power detected at a radar receiver.
Figure 3:
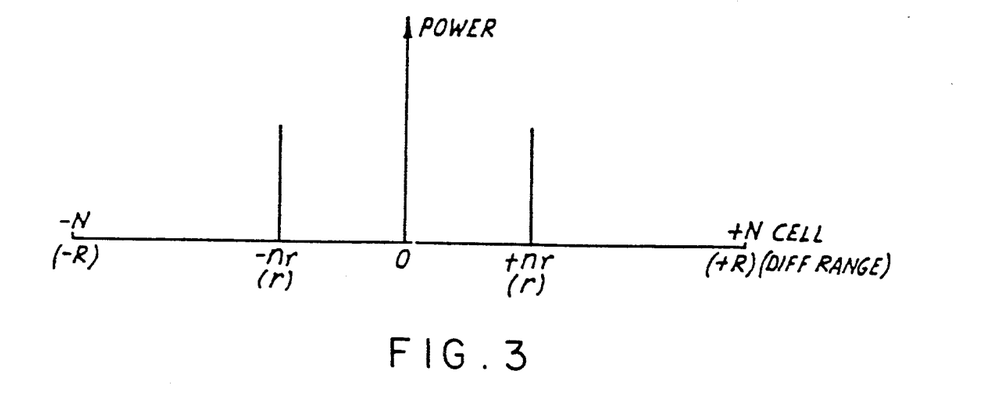
FIG. 3 shows a mapping of a pair of scatterers in the differential range domain, FIGS. 4a, and b, show respectively idealised representations of pure spectra for clutter and target scatterers.

As the frequency is swept in this manner, so the relative phases of returns from the two scatterers will change causing an oscillatory variation with frequency in the power of the pulse returns from the scatterers detected at the receiver, as shown in FIG. 2. A frequency analysis of returns, for example a Discrete Fourier Transform (DFT) of returns produces a mapping of the pair into 2N cells in the differential range domain. Thus, in the described example a "line" is produced in cells $\pm n_r$ corresponding to the differential range r, as shown in FIG. 3, and the $\pm N^{th}$ cells correspond to the maximum resolvable differential range R which is related to the bandwidth B of the radar by the expression $$R = \frac{c}{2B} \qquad \text{Eq. 1}$$

where c is the speed of light.

The invention relates to the discovery that provision of a reference scatterer having an appropriate velocity component in the range direction enables a true range profile representation of the whole contents, comprising target and/or clutter scatterers, of the range cell to be derived.

Figure 4A:
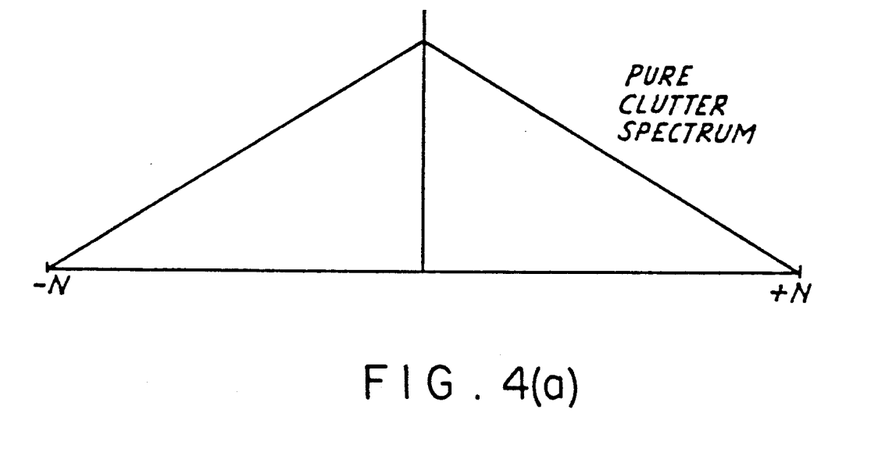
Figure 4B:
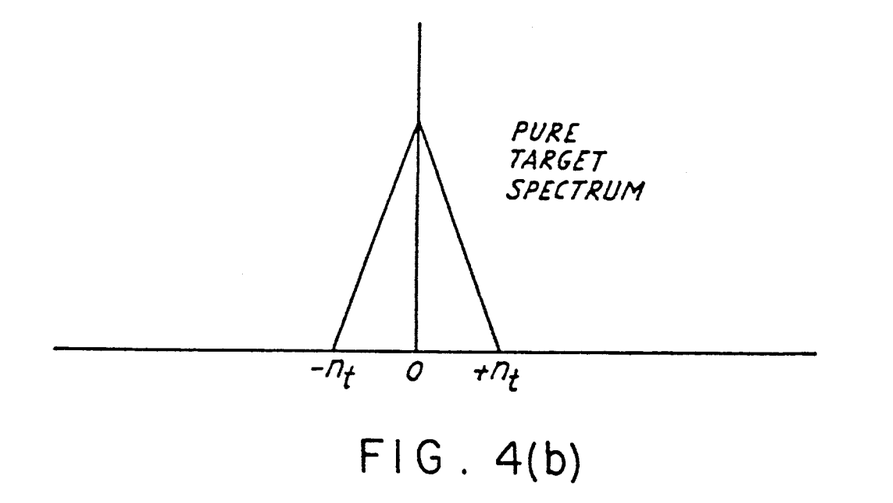

In general, a distributed assembly of scatterers produces a distribution of energy in the differential range domain, hereinafter referred to as a spectrum. The spectrum from clutter alone, whose scatterers are assumed to be spread across the whole of the patch illuminated by the radar pulse, will be relatively broad, as shown in FIG. 4a whereas a target alone (e.g. a tank or truck) being confined to a relatively small region of space will produce a narrower spectrum of the form shown in FIG. 4b. It will be appreciated that the output from the Discrete Fourier Transform (DFT) will consist of 2N samples although for convenience the envelope of the spectra are drawn as being continuous. These spectra, which are referred to hereinafter as pure spectra, are produced by returns from many pairs of scatterers each pair consisting respectively of two target scatterers or two clutter scatterers. The spectra will consist of returns from multiple pairs of scatterers having a spread of differential ranges, the spread within one DFT channel being approximately $$\frac{c}{2F},$$

the differential range resolution of the system.

When targets and clutter are present together the spectrum will also contain components due to returns from pairs consisting of one target scatterer and one clutter scatterer. This component of the spectrum is referred to here as the hybrid spectrum.

Figure 4C:
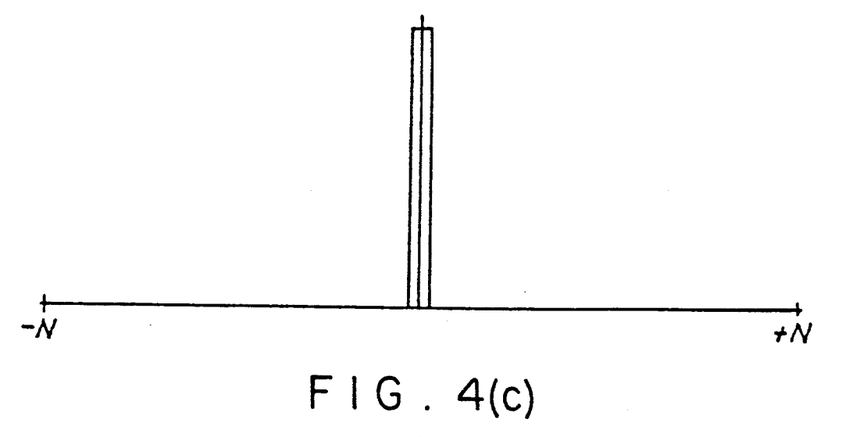
FIG. 4c shows the pure spectrum for a point scatterer.

A hybrid spectrum may be understood by considering first the effect of returns from a stationary point reference scatterer interfering with returns from an assembly of clutter scatterers, distributed uniformly across the range cell. In these circumstances the pure spectrum due to the reference scatterer only, has the form shown in FIG. 4c whereas the pure spectrum due to the clutter scatterers only has the form shown in FIG. 4a.

Figure 4D:
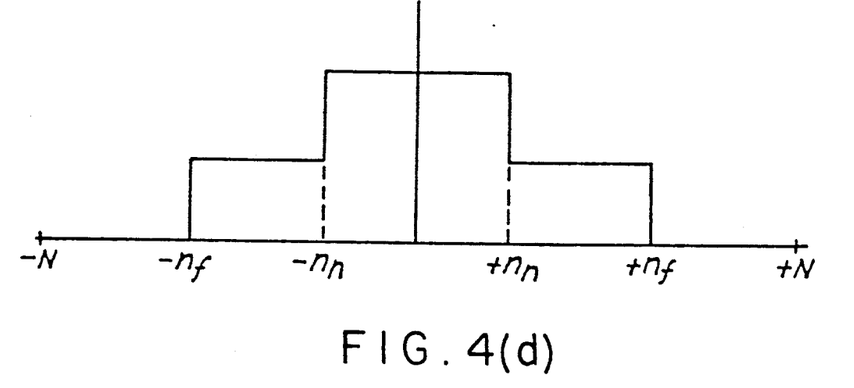
FIG. 4d shows an idealized representation of a hybrid spectrum derived from a point target scatterer and a distributed assembly of other scatterers.

If the range differential between the reference scatterer and the nearer edge of the range cell (defined by the radar pulse length) corresponds to the $n_n^{th}$ cell in the hybrid spectrum and the range differential between the reference scatterer and the further edge of the range cell corresponds to the $n_f^{th}$ cell in the hybrid spectrum, then for a point reference scatterer the hybrid spectrum will be of the form shown in FIG. 4d. In general, the hybrid spectrum for an extended target comprising several scatterers will be more complex.

In practice, an observed spectrum will generally comprise a mixture of both pure and hybrid spectra and an individual line may include contributions from different pair combinations i.e. pure spectral components comprising target/target; clutter/clutter; reference/reference; and hybrid spectral components comprising clutter/target; reference/target; reference/clutter.

It will be appreciated that the spectra derived in this way represent, in effect, the autocorrelation function of the distribution in range of the individual scatterers illuminated by the radar.

The two spectral lines shown in FIG. 3 are shown as being identical for positive and negative values of differential range. This will always be true for radar returns processed as described so far and so the spectra shown in FIG. 4 are shown as symmetrical about the centre line (zero differential range).

In practice, the reference scatterer is arranged to move with respect to the clutter and target with a relative velocity which has a component in the direction of the radar. Although the pure spectra remain unchanged in these circumstances, the hybrid spectral components relating to the reference scatterer may undergo a modification.

If, for example, a point reference scatterer is moving up or down range with a relative velocity v then during a time interval T, taken to sweep the frequency f across a frequency range F, the differential range of a pair of scatterers contributing to the hybrid spectrum will change by an amount $+vT$ or $-vT$, depending on the sense of the relative movement.

Over the period of the sweep the relative phases of returns from this pair will change by an amount $$\phi = \frac{4\pi Tv}{c}\left(f + \frac{F}{2}\right)$$

and since, in general, $F \ll f$ $$\phi = \frac{4\pi fTv}{c} \qquad \text{Eq 2}$$

The effect of motion of the reference scatterer in the range direction is that the reference scatterer will approach some clutter scatterers within the range cell and recede from others. In these circumstances, components of lines in cells below $n_n$ will split; those components due to up-range clutter scatterers moving in one sense along the differential range axis of the spectrum and those components due to down-range clutter scatterers moving in the opposite sense. In contrast, components of those lines in cells between $n_n$ and $n_f$ will not split but are caused to shift in the same sense, depending on the direction of relative motion of the reference scatterer, (since these lines contain only either up or down-range components). A critical velocity $$v_c = \frac{cF}{fBT},$$

corresponding to a phase change of $4N\pi$ can be found which leaves the spectrum in the original (v=0) position, as shown in FIG. 4d.

The invention relates to the discovery that the effect of the velocity of the reference scatterer on the hybrid spectrum can be exploited to assist in measuring the true range profile within the radar footprint and therefore in characterising any target present and/or the clutter environment.

As the relative velocity v of the reference scatterer increases, the hybrid spectrum, will, in general, be smeared and shifted in differential range. At a velocity $$v_r = \frac{v_c}{2}$$

Figure 5:
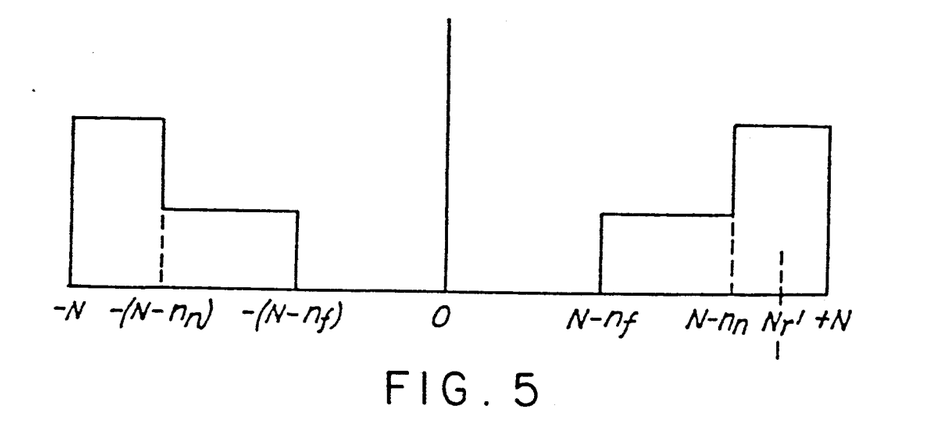
FIG. 5 shows the hybrid spectrum in a "reflected" position.

(or an odd multiple thereof) the hybrid spectrum assumes a "reflected" condition as shown in FIG. 5.

Figure 6A:
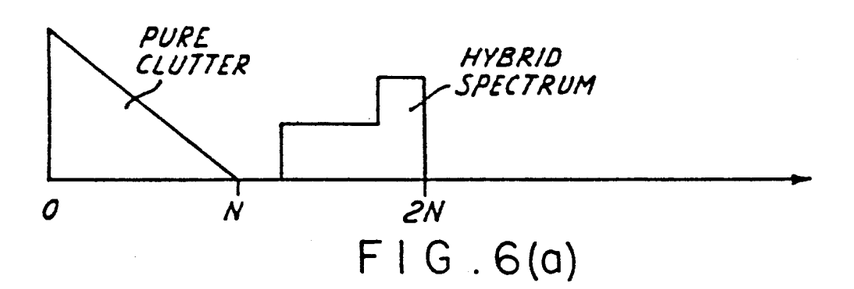
FIGS. 6a, 6b, and 7 illustrate the effect of over-sampling on the hybrid spectrum.

In the examples described hereinbefore the frequency step size δF will, in general, be half the bandwidth i.e. B/2. The inventor has discovered, however, that benefit can be derived if a smaller step size than this is used. This does not affect the pure spectra; however, provided the reference scatterer velocity is sufficiently high, or the frequency sweep period T is chosen appropriately, the hybrid spectrum will now have to be translated through more than N cells to obtain a reflection. If, for example, the step size is B/4 (hereinafter referred to as double sampling i.e. an oversampling ratio of m=2) the hybrid spectrum will be "reflected" at the position shown in FIG. 6a i.e. when the velocity v corresponds to a shift through 2N cells. In this position the hybrid spectrum relating to the reference scatterer does not overlap with the remaining spectral components and so can be detected with no interference from the remaining spectra.

With double—sampling a "reflection" arises if the relative reference scatterer velocity v is an odd multiple of $\pm v_c$ corresponding to an odd multiple of 2N cells, although, as before, a reflection may still be obtained at lower velocities provided the sweep period T is increased accordingly or the frequency range F is reduced. Thus, if $v_c = \pm 8.75$ ms$^{-1}$ and T=12.8 ms a reflection may still be obtained for reference scatterer velocities as low as $v = \pm 2.2$ ms$^{-1}$.

Figure 6B:
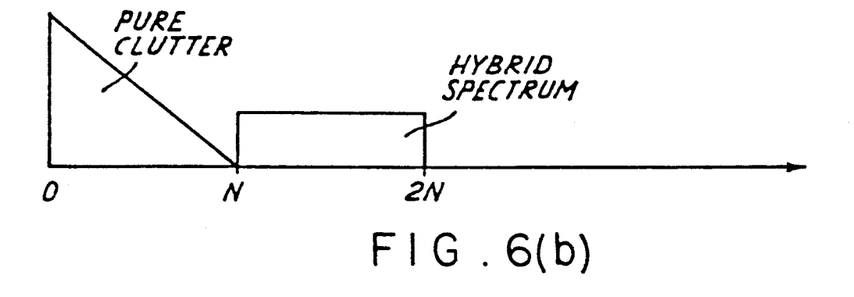

In general, the hybrid spectrum associated with the moving reference scatterer albeit smeared, will be separated from the pure clutter and target spectra for a range of reference scatterer velocities spanning the reflection velocities and, as shown in FIG. 6b, first becomes fully separated when the reference scatterer velocity corresponds to $2N - n_f$ or $2N - n_n$ cells, depending on whether the reference scatterer is moving towards the near or the far edge of the range cell.

As the reference scatterer velocity increases, by an amount corresponding to a further translation through N cells beyond the value at which a reflection occurs, the hybrid spectrum resumes the position shown in FIG. 6b, but is reversed. As the reference scatterer velocity increases still further the hybrid spectrum will re-enter the region occupied by the pure clutter spectrum, returning to its original position after traversing a further $N + n_f$ or $N + n_n$ cells. The complete cycle, therefore, corresponds to a translation through 4N cells, during the course of which the hybrid spectrum is completely separated from the pure clutter spectrum for a velocity excursion corresponding to N cells.

In the situation illustrated in FIG. 6b, the hybrid spectrum in addition to being (just) separated from the pure spectrum, is unfolded—an effect referred to hereinafter as "dissection". The unfolded spectrum is the range cross-correlation between the reference scatterer and the target and clutter true range profile. Thus, it can be that the combination of a moving reference scatterer with over-sampling enables the true clutter and target range profile to be obtained.

Figure 7:
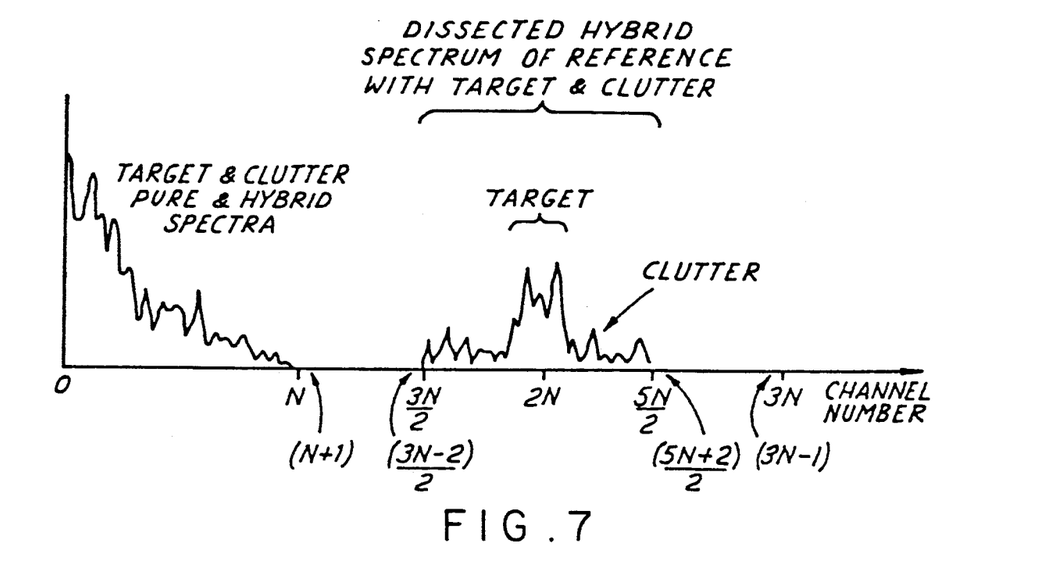

It has been found advantageous to take an oversampling ratio of 3, as shown in FIG. 7, so that the hybrid spectrum is translated over 2N cells at most corresponding to a radial velocity of $\pm 8.75$ m/s. During the sweep cycle time of 12.8 ms, the scatterer will therefore have moved about 112 mm.

Suppose now that the reference scatterer velocity is obtained by carrying it at the end of an arm which is spun about a vertical axis and further suppose that the range autocorrelation function is formed only when the arm is approximately orthogonal to the radar sightline. It is also assumed that the radar sightline is at a low grazing angle and that the centre of the range gate is held exactly on the centre position of the range profile required, then the minimum spectral shift required to move the hybrid spectrum outside the pure clutter spectrum will be N spectral channels. If the oversampling ratio is defined as s, then it follows that $s \geq 2$.

In general, if the hybrid spectrum is to be moved to the centre of the clear part of the spectrum (between channels N and sN) then the hybrid spectrum must be moved over $(s+1)/2$ channels. The velocity of the reference scatterer required to shift the hybrid spectrum by one channel is $$\delta v = \frac{c}{2fT}$$

so it follows that the required velocity is $$v_s = c \frac{(s+1)N}{4fT}$$

For $s = 3$, $N = 35$, $f = 94$ GHz and $T = 12.8$ ms, it follows that $v_3 = 8.75$ m/s. It is relevant to note that $v_s$ is inversely proportional to T.

It is assumed that $V_s$ is approximately constant over the period T. To prevent undue smearing or 'defocussing' of the shifted hybrid spectrum it is assumed that $V_s$ must not change during T by more than $\delta V$, the velocity required to shift the spectrum by one channel. If the velocity of the reference scatterer is obtained by rotation at the end of an arm then it follows that the radius of the scatterer arm, r, must be such that i.e.,
$$\frac{1}{2}\left[\frac{v_s T}{2r}\right]^2 \leq \frac{2}{(s+2)N}$$

$$r \geq \frac{1}{16} \frac{c}{f} (s+1)N[(s+2)N]^{0.5}$$

For $s = 3$, $N = 35$ and $F = 94$ GHz, it follows that $r \geq 370$ mm.

At the minimum radius of 370 mm, the angular velocity is 3.75 revs/sec or 225 rpm; use of a longer radius of, course, reduces the spin rate.

The residual drift across one channel is removed entirely, if required, by modulating the pulse repetition frequency (prf) so that the change in radial distance of the scatterer between pulses is constant. Insofar as the perceived velocity is following a cosine law in the region of interest, it follows that the prf should do likewise; the required change in prf in the case above is $1/(2.5 \times 35) = 1.1\%$.

Figure 8:
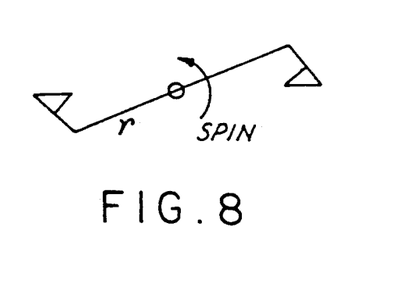
FIGS. 8 to 10 show rotating reflectors for obtaining a "dissection" condition.
Figure 9:
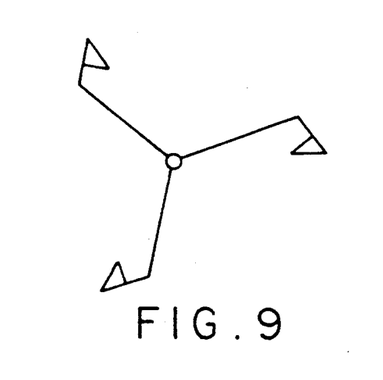
Figure 10:
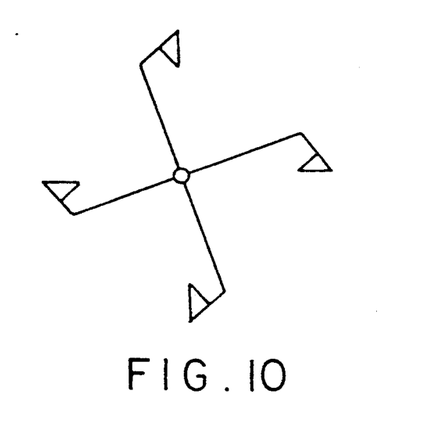

Insofar as a suitable range autocorrelation function is formed only when the arm is orthogonal to the sightline, there is an incentive to keep the radius of the arm as small as possible. Taking $r = 370$ mm, it follows that the time useage will be only 112 mm/($2\pi \times 370$ mm) $= 4.8\%$. If the scatterer consists of a corner reflector, however, a number of arms and scatterers can be used, as shown in FIGS. 8 to 10; all surfaces except insides of reflector are covered or painted with radar absorbent material. The arms are cranked to avoid specular reflection during frequency cycle periods. The maximum number of arms is likely to be 4, for which the time useage will be $4 \times 4.8 = 19.2\%$.

Figure 11:
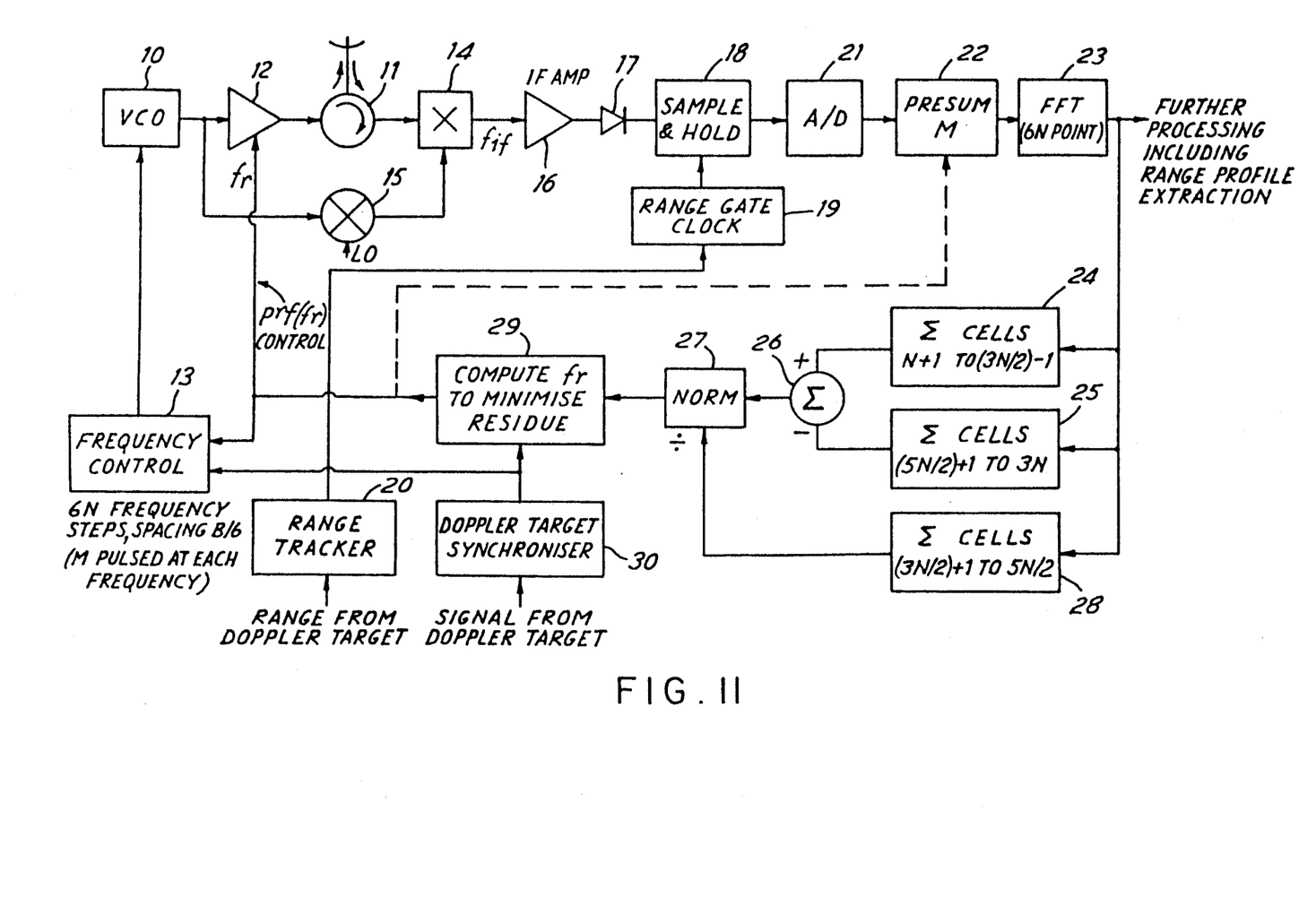
FIG. 11 shows a radar system according to the invention.

In general, the speed of rotation of the scatterers must be controlled to be within a certain tolerance proportional to the prf. Any minor error in the spin velocity causes the dissected hybrid spectrum to move up or down in frequency. A technique with which to sense the correction required is separately to integrate the contents of the frequency channels from $(N+1)$ to $(3N-2)/2$ and from $(5N+2)/2$ to $(3N-1)$ as shown in FIG. 11. Insofar as the spectral width of the dissected hybrid spectrum is of the order of N channels, any departure from a minimal value in either of these integrals indicates the need for a change in mean prf and the sense in which it is required. The loop gain is clearly a function of the total energy in the hybrid spectrum, and normalisation of the two integrals by this energy maintains the loop gain at a substantially constant value.

The centre of the dissected hybrid spectrum always corresponds to the range of the centre of the radar footprint. If it is required to keep a trial target in the centre of the spectrum (i.e. the range profile) then the range sample time delay must be set accordingly.

If the radar, described hereinafter, is stationary and the target is on a turntable at a fixed range, then the spinning reference scatterers can be set up alongside the target and turntable. The range gate delay required can be set manually and then locked while the target is rotated.

The frequency cycle periods are synchronized with the reference scatterer angle so that templates are recorded only for the periods when the reflectors are face-on. In principle, this phasing need only be set-up at the beginning of the measurement exercise if the stabilities are adequate. A preferred method would be to use an auxiliary system regularly to sense the synchronisation and hence maintain lock despite any drifts. There are clearly many ways in which this could be instrumented. One very simple way is to use a visible or IR arrangement on the reference scatterer producing a beam having a narrow azimuthal angle and covering a much wider elevation angle. The beam then spins with the reference scatterer and is received by an optical system located at the radar and pointed towards the reference scatterer. The relatively short pulse received on every rotation of the reference scatterer constitutes the synchronising pulse.

Such a scatterer can now be mounted on the target if required as rotation of the target transferred to the scatterer would automatically be corrected for.

With such a scatterer mounted on the target and the radar mounted on a helicopter, it is possible to conduct mobile trials in which the target is driven through a variety of clutter backgrounds at various angles to the radar.

The synchronized scatterer automatically takes out the relative rotation while the helicopter radio altimeter can be used to hold the radar grazing angle at the nominal value. The only further facility required for mobile trials is a means for maintaining accurate range lock on to the target.

For this range tracking not to smear the range profiles significantly, it must be accurate to the order of 100 mm. One way to achieve this accuracy is to make one or more of the scatterers on the scatterer a corner reflector of optical quality and then to measure the range during the template period using a laser rangefinder on the helicopter. The rangefinder is coupled to the radar head in much the same way as the lighthouse receiver, and can share the same optics.

If it is required to obtain the characteristics of clutter alone, i.e., without the target being present, then the scatterer can be carried on a small vehicle which has been treated to minimise its radar cross section. Insofar as the width of the radar footprint will be large relative to this vehicle (50 m for the representative radar considered above) then the masking effect by the vehicle on clutter underneath it and in its shadow is negligible.

With a radar using circular polarization, the hybrid spectra obtained are the co-polar spectrum for target and clutter scatterers having the same hand as the scatterer while the cross-polar spectrum corresponds to scatterers in the scene of the opposite hand.

For co-polar odd-bounce scene scatterers, the preferred scattering surface is a corner reflector (i.e., a trihedral). At the RF frequency of interest, a corner reflector having 100 mm sides produces an rcs of 10 m$^2$ while on having 170 mm sides gives 100 m$^2$. These areas are of the order of size required and are not inconsistent with even the minimum size of the scatterer. Detailed examination shows that the phase centre of a corner reflector varies with viewing angle, so this is taken into account appropriately (possibly by introducing an additional minor prf modulation).

For co-polar even-bounce scene scatterers, dihedral scattering surfaces are used. For a 2 or 4 arm scatterer, the two types of scattering surfaces are put on alternate arms to enable the four sets of hybrid spectra to be obtained from each sequential pair of templates. A drawback with the dihedral scattering surface is that it presents a large effective cross-section over only a relatively narrow angle centred on the normal to the fold line. One solution is to use a vertical stack of similar dihedrals (instead of just one) separated in azimuthal angle by their common azimuthal "beamwidth". If the scatterer diameter is doubled, then the template period corresponds to an azimuthal rotation of about 112 mm/(2×370 mm), namely 150 mrad. If each dihedral has a square aperture of say 100 mm, then it generates a useful cross-section over about 30 mrad.

Consequently, a stack of 150/30, namely 5 such dihedrals are required. Insofar as their "beamwidth" does not cut off abruptly, interference occurs at the crossovers and care must be taken to confirm that the consequent effects are acceptable.

A preferred way to extract co-polar even-bounce scene scatterers (and cross-polar odd-bounce ones) is to place a circular polarizer over the aperture of a corner (trihedral) reflector to make it equivalent to an even-bounce scatterer, and this can be done by using a circular polarizer. Therefore preferably there is used a scatterer with 2 or 4 arms and corner reflectors, alternate ones being fitted with circular polarizers. After two frequency cycle periods, noise permitting, the radar has produced range profiles of the contents of the footprint of both co-polar and both cross-polar returns. The open corner reflectors are used for ranging.

FIG. 11 shows, in block schematic form, a system for range profiling as described herein. In this example the frequency over-sampling ratio, m, is 3 and the frequency sweep period T is adjusted to maintain the "dissected" spectrum centred at the 2N$^{th}$ cell. To this end, the energies in cells spanning equal bandwidths just above the N$^{th}$ cell in the hybrid spectrum (i.e. cells N+1; ... N+1+p) and just below the 3N$^{th}$ cell (i.e. cells 3N−1; ... 3N−1−p) are summed and the sweep period T is adjusted to maintain equality of the two summations.

The system includes a voltage controlled oscillator 10 coupled to a duplexer 11 via a pulse modulation circuit 12. The transmission frequency is controlled by a digital control circuit 13, the frequency being swept in stepwise manner over a frequency range F (e.g. 500 MHz), the frequency of 6N successive batches of M (e.g. 16) pulses being incremented in steps of $F/6N$. Returns received in response to each transmitted pulse are then combined in a mixing circuit 14 with the signal from a local oscillator 15 to generate a signal IF. This IF signal is amplified at 16 and passed to a square law detector 17 and range gated in a sample and hold circuit 18 under the control of the range gate clock 19, which is set by the range tracker 20. The gated IF signal is fed via an analogue-to-digital conversion circuit 21 to a pre-summing circuit 22 wherein each signal is summed with signals for the same range cell derived from earlier pulses transmitted at the same frequency. After pre-summing, each set of 6N signals derived is passed to a transformation circuit 23. The transformation circuit carries out a Fast Fourier Transform on respective sets of 6N signals and generates corresponding sets of 6N transformation signals, one set for each range cell.

To maintain the "dissected" spectrum centred at the $2N^{th}$ cell respective summations are carried out, in the manner described hereinbefore, in two summing circuits 24, 25 and the summations derived are differenced in a differencing circuit 26. The resultant difference signal is normalized in circuit 27 by the total signal energy present in the "dissected" spectrum range (i.e. the true profile), obtained from summing circuit 28. This normalized difference signal provides an error signal whose magnitude and sign are used in circuit 29 to estimate any change required in the value of prf, fr, to achieve the value of T which will maintain the dissected spectrum centred on the $2N^{th}$ range cell.

As described earlier, the dissected spectrum will best represent the true range profile during the period when the spinning reference reflectors are face-on to the radar. The circuit 29 is therefore controlled by circuit 30, which gives a control signal synchronized with the rotating scatterer (using the method described earlier, such as a rotating light or IR source), so as to calculate the required value of fr only at the times when the reference scatterer is appropriately orientated. The range tracker circuit 20 is similarly controlled by a laser tracker or other suitable device, as described earlier.

It will be appreciated that oversampling in this manner increases the load on the FFT by a factor 2 log 2 in the case of double sampling. This increased load may be accommodated by doubling the sweep period T, or alternatively, if T is held fixed, by reducing the frequency range F by a factor 2 log 2. This has the disadvantage, however, of reducing resolution by the same factor and so if possible the power of the processor should be increased.

Finally it will be understood that the techniques described herein are not restricted to radars operating with a fixed or single antenna polarisation. Several spectra may be generated simultaneously or sequentially using co-polar and cross-polar responses from scatterers and the techniques described herein may be used to exploit the effects of scatterer motion in any or all of these spectra.

What is claimed is:

1. A system for obtaining a range profile, the system comprising a radar and a reference scatterer having a velocity component in the range direction, the radar comprising means for transmitting a succession of pulses at different frequencies to a region and for receiving corresponding returns from scatterers, including the reference scatterer, within said region irradiated by the pulses; transformation means effective to derive from said returns a plurality of transformation signals representing a distribution of pairs of said scatterers, as a function of differential range, and means to influence transmission of said succession of pulses so as to selectively emphasise the effect of the reference scatterer in said plurality as compared with the effect of the other scatterers, said frequencies being transmitted in accordance with a monotonic sequence and the period for transmitting the sequence of frequencies being controllable.

* * * * *